United States Patent [19]

Oku et al.

[11] Patent Number: 4,983,894
[45] Date of Patent: Jan. 8, 1991

[54] BRUSHLESS MOTOR DRIVING SYSTEM

[75] Inventors: Hiroyuki Oku, Takarazuka; Masahiro Yasohara, Amagasaki; Hiromitsu Nakano, Hirakata, all of Japan

[73] Assignee: Matsushita Electric Industrial Co., Ltd., Osaka, Japan

[21] Appl. No.: 469,320

[22] Filed: Jan. 24, 1990

[30] Foreign Application Priority Data

Feb. 1, 1989 [JP] Japan .................................. 1-022863
Feb. 3, 1989 [JP] Japan .................................. 1-024997
Sep. 1, 1989 [JP] Japan .................................. 1-227699

[51] Int. Cl.⁵ .............................................. H02P 6/02
[52] U.S. Cl. ................................... 318/138; 318/254
[58] Field of Search ...................... 318/138, 254, 439

[56] References Cited

U.S. PATENT DOCUMENTS

| 4,403,177 | 9/1983 | Weber et al. ............ 318/138 X |
| 4,712,050 | 12/1987 | Nagasawa et al. .......... 318/254 |
| 4,743,815 | 5/1988 | Gee et al. ................. 318/254 |
| 4,752,724 | 6/1988 | Radziwill et al. .......... 318/254 |

FOREIGN PATENT DOCUMENTS

| 57-180382 | 11/1982 | Japan ................................. 318/254 |
| 60-156293 | 8/1985 | Japan ................................. 318/254 |
| 60-234494 | 11/1985 | Japan ................................. 318/254 |
| 61-170292 | 7/1986 | Japan ................................. 318/254 |
| 62-71486 | 4/1987 | Japan ................................. 318/254 |
| 63-194587 | 8/1988 | Japan ................................. 318/254 |

2119589A 11/1983 United Kingdom .
2134731A 8/1984 United Kingdom .

Primary Examiner—Bentsu Ro
Attorney, Agent, or Firm—Stevens, Davis, Miller & Mosher

[57] ABSTRACT

In a system for driving a brushless motor having motor drive coils connected to respective drive transistors, voltages induced in the drive coils when the motor is rotating are continuously detected to produce energization switching signals to be applied to the drive transistors, thereby switching over energization of the drive coils, so that the motor can be continuously driven at optimum energization timing regardless of its rotational speed. Further, when a rotational direction command signal is applied to a forward-backward switching circuit to instruct the motor to rotate in the backward rotational direction while the motor is rotating in the forward rotational direction, torque of the opposite direction is produced to change the rotational direction of the motor. Further, separate-excitation timing pulse signals are used to sequentially switch over energization of the motor drive coils when the motor is not rotating or it is rotating at a very low speed, and hence voltages induced in the motor drive coils cannot be detected. As soon as the voltages induced in the drive coils have become able to be detected due to the rotation of the motor, self-excitation timing pulse signals are then used to sequentially switch over energization of the drive coils.

3 Claims, 13 Drawing Sheets

MISSING PAGE TEMPORARY NOTICE

PATENT # 4983894 FOR ISSUE DATE 1-08-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 4

BRUSHLESS MOTOR DRIVING SYSTEM

BACKGROUND OF THE INVENTION

1. Field of the Invention

This invention relates to a system for driving a brushless motor used in an audio device, a visual display device and the like.

2. Description of the Prior Art

High reliability and a long useful service life are required for a motor used in an audio device, a visual display device and the like. In order to satisfy the above requirements, it is a recent tendency to employ, in place of a conventional d.c. motor having brushes and a commutator, a so-called brushless motor in which a position sensor is provided to detect the angular position of rotation of a rotor and, on the basis of the output signal of the position sensor, a plurality of drive transistors connected in series with a plurality of drive coils of a plurality of phases respectively are sequentially turned on so as to continuously rotate the rotor.

The structure and operation of a prior art brushless motor driving system will be described with reference to FIGS. 10 to 13.

FIG. 10 is a block circuit connection diagram of the prior art brushless motor driving system. Referring to FIG. 10, drive coils 401a, 401b and 401c of a brushless motor are connected in series with drive transistors 403a, 403b and 403c respectively. The drive transistors 403a, 403b and 403c are grounded at their emitters. These drive transistors 403a, 403b and 403c are connected at their collectors to a power supply terminal 402 through the drive coils 401a, 401b and 401c respectively. Further, the drive transistors 403a, 403b and 403c are connected at their collectors to inverted input terminals of comparators 405a, 405b and 405c respectively. The power supply terminal 402 is also connected to non-inverted input terminals of the comparators 405a, 405b and 405c. These comparators 405a, 405b and 405c are connected at their output terminals to corresponding input terminals respectively of a differentiation circuit 408, and this differentiation circuit 408 is connected at its output terminals to corresponding input terminals respectively of a delay circuit 409. The delay circuit 409 is connected at its output terminals to corresponding input terminals respectively of an energization switching circuit 410, and a forward-backward command circuit 411 is also connected at its output terminal to a corresponding input terminal of the energization switching circuit 410. The energization switching circuit 410 is connected at its output terminals to corresponding input terminals respectively of an energization switching signal amplifier circuit 406. This energization switching signal amplifier circuit 406 is connected at its output terminals to the bases of the drive transistors 403a, 403b and 403c respectively.

The operation of the prior art brushless motor driving system having the structure described above will now be described with reference to FIGS. 11 to 13. FIG. 11 shows signal waveforms appearing when the brushless motor in the system shown in FIG. 10 is rotating in the forward rotational direction, FIG. 12 shows signal waveforms appearing when the brushless motor is rotating in the backward rotational driection, and FIG. 13 shows signal waveforms appearing when a backward rotation command signal is applied while the brushless motor is rotating in the forward rotational direction.

A power supply voltage $V_{402}$ is applied to the power supply terminal 402, and voltages $E_{401a}$, $E_{401b}$ and $E_{401c}$ having waveforms as shown in FIG. 11 are induced in the drive coils 401a, 401b and 401c respectively. The comparators 405a, 405b and 405c compare the voltages $E_{401a}$, $E_{401b}$ and $E_{401c}$ with the power supply voltage $V_{402}$ and generate output signals $V_{405a}$, $V_{405b}$ and $V_{405c}$ having waveforms as shown in FIG. 11, respectively. For example, the output signal $V_{405a}$ of the comparator 405a comparing the voltage $E_{401a}$ with the voltage $V_{402}$ is $V_{405a}$ of low level when $E_{401a} \geqq V_{402}$, but it is $V_{405a}$ of high level when $E_{401a} < V_{402}$. The differentiation circuit 408 differentiates the leading edges of the output signals $V_{405a}$, $V_{405b}$ and $V_{405c}$ of the respective comparators 405a, 405b and 405c and generates pulse signals Poa, Pob and Poc having waveforms as shown in FIG. 11. These pulse signals Poa, Pob and Poc are applied to the delay circuit 409 through which they are turned into pulse signals Pa, Pb and Pc delayed by a predetermined delay time T relative to the original signals Poa, Pob and Poc respectively. When the forward-backward command circuit 411 generates a forward rotation command signal $V_{F/R}$, the energization switching circuit 410 generates energization switching signals Va, Vb and Vc having waveforms determined by the pulse signals Pa, Pb and Pc supplied from the delay circuit 409. That is, the energization switching signal Va is turned to high level in response to the application of the pulse signal Pa, but it is turned to low level in response to the application of the pulse signal Pb. The energization switching signal Vb is turned to high level in response to the application of the pulse signal Pb, but it is turned to low level in response to the application of the pulse signal Pc. The energization switching signal Vc is turned to high level in response to the appliecation of the pulse signal Pc, but it is turned to low level in response to the application of the pulse signal Pa.

When the motor is rotating in the forward rotational direction, the energization switching signals, Va, Vb and Vc provide optimum energization timing with respect to the induced voltage signals $E_{401a}$, $E_{401b}$ and $E_{401c}$. These energization switching signals Va, Vb and Vc are applied, after having been amplified through the energization swithcing signal amplifier circuit 406, to the bases of the respective drive transistors 403a, 403b and 403c, so that the motor continues to efficiently rotate in the forward rotational direction.

On the other hand, when the forward-backward command circuit 411 generates a backward rotation command signal $V_{F/R}$, and the motor rotates in the backward rotational direction, signal waveforms as shown in FIG. 12 appear in the system. In this case, the energization switching signal Va is turned to high level in response to the application of the pulse signal Pa, but it is turned to low level in response to the application of the pulse signal Pc, the energization switching signal Vb is turned to high level in response to the application of the pulse signal Pb, but it is turned to low level in response to the application of the pulse signal Pa, and the energization switching signal Vc is turned to high level in response to the application of the pulse signal Pc, but it is turned to low level in response to the application of the pulse signal Pb.

In this case too, the energization switching signals Va, Vb and V provide optimum energization timing with respect to the induced voltage signals $E_{401a}$, $E_{401b}$ and $E_{401c}$, so that the motor continues to efficiently rotate in the backward rotational direction like in the case of the rotation in the forward rotational direction.

However, a problem such as pointed out below has been encountered in the prior art brushless motor driving system. That is, when the forward-backward command circuit 411 generates a backward rotation command signal $V_{F/R}$ while the motor is rotating in the forward rotational direction, the switching signals may not act to produce torque which is of the opposite direction with respect to the rotational direction of the rotor, and the rotational direction of the motor may not be changed. Also, because the delay circuit 409 employed in the prior art brushless motor driving system includes means such as a monostable multivibrator providing a fixed delay time, the system has not been applicable to a brushless motor whose rotational speed is variable over a wide range. Further, the prior art brushless motor driving system has such an additional problem that the motor cannot be started from a standstill state because voltages are not induced in the drive coils of the individual phases in such a state of the motor.

SUMMARY OF THE INVENTION

With a view to solving the aforementioned problems encountered in the prior art system, it is an object of the present invention to provide a highly reliable brushless motor driving system in which the rotational direction of the motor can be immediately changed in response to a forward-backward rotation command, in which the motor can be easily started from a standstill state, and in which voltages induced in the motor drive coils can be detected to switch over energization of the drive coils in whatever state of the motor, so that the brushless motor can be continuously driven at optimum energization timing regardless of a rotational speed of the motor.

In accordance with one aspect of the present invention which attains the above object, there is provided a system for driving a brushless motor comprising a plurality of motor drive coils of a plurality of phases respectively, a plurality of drive transistors connected to the drive coils respectively, an energization switching circuit sequentially applying a plurality of energization switching signals to the drive transistors respectively so as to switch over energization of the drive coils, reference phase detecting means comparing voltages induced in the drive coils with a neutral point potential of the drive coils or with a power supply voltage for detecting a reference phase of rotation of the rotor of the motor thereby generating a plurality of reference phase pulse signals corresponding to the plurality of phases respectively, energization switching pulse generating means for generating a plurality of energization switching pulse signals corresponding to the plurality of phases respectively when a predetermined delay time has elapsed after generation of each of the reference phase pulse signals, and delay time setting means for setting the predetermined delay time to a value proportional to the period of time between the time of generation of the energization switching pulse signal corresponding to a drive coil of one phase and the time of generation of the reference phase pulse signal appearing while a drive coil of a next phase to be energized next remains de-energized.

In accordance with another aspect of the present invention, there is provided a system for driving a brushless motor comprising a plurality of motor drive coils of a plurality of phases respectively, a plurality of drive transistors connected to the drive coils respectively, a forward-backward switching circuit generating a command signal instructing the rotational driection of the motor, energization timing detecting means detecting voltages induced in the drive coils for generating a plurality of timing pulse signals corresponding to the plurality of phases respectively to be used for switching over energization of the drive coils, a first logic circuit including a plurality of flip-flops selectively set or reset when the timing pulse signals are applied together with the rotational direction command signal, and a second logic circuit for converting output signals of the first logic circuit into corresponding energization switching signals according to the level of the rotational direction command signal so as to sequentially energize the drive transistors connected to the drive coils respectively.

In accordance with still another aspect of the present invention, there is provided a system for driving a brushless motor comprising a plurality of motor drive coils of a plurality of phases respectively, a plurality of drive transistors connected to the drive coils respectively, energization timing detecting means detecting voltages induced in the drive coils for generating a plurality of self-excitation timing pulse signals corresponding to the plurality of phases respectively to be used for switching over energization of the drive coils, an initializing pulse generating circuit generating an initializing pulse signal representing a logical sum of the self-excitation timing pulse signals, a timer circuit generating a plurality of separate-excitation mode switching pulse signals when, after application of one of the pulses of the initializing pulse signal, a next initializing pulse is not applied within a predetermined period of time, a mode latch circuit including a flip-flop reset by the initializing pulse signal but set by the separate-excitation mode switching pulse signal thereby generating a mode setting signal for establishing a separate-excitation switching mode or a self-excitation switching mode, a separate-excitation timing pulse generating circuit generating a plurality of separate-excitation timing pulse signals corresponding to the plurality of phases respectively only in the separate-excitation switching mode so as to switch over energization of the drive coils in the separate-excitation switching mode, a plurality of timing pulse synthesizing circuits generating a plurality of energization switching pulse signals each representing a logical sum of the self-excitation timing pulse signal corresponding to one of the plurality of phases and the separate-excitation timing pulse signal corresponding to the same phase, and an energization switching circuit generating a plurality of energization switching signals in response to the application of the energization switching pulse signals so as to sequentially energize the drive transistors connected to the drive coils respectively.

According to on embodiment of the brushless motor driving system of the present invention having the structure described above, voltages induced in the motor drive coils when the motor is rotating are continuously detected to produce the energization switching signals thereby switching over energization of the drive coils, so that the motor can be continuously driven at optimum energization timing regardless of the rotational speed of the motor.

Also, according to another embodiment of the present invention, as soon as the rotational direction command signal generated from the forward-backward switching circuit instructs rotation in the backward rotational direction while the motor is rotating in the forward rotational direction, torque which is of the opposite direction with respect to the rotational direction of the motor is produced thereby immediately changing the rotational direction of the motor, so that the motor is now continuously rotated in the backward rotational direction. Thus, the rotational direction of the motor can be changed as soon as the opposite rotational direction command is issued.

Further, according to still another embodiment of the present invention, the separate-excitation timing pulses are used to sequentially switch over energization of the drive coils of individual phases when the motor is in a standstill state or when the motor is rotating at a very low speed and hence voltages induced in the drive coils of individual phases cannot be detected. Then, as soon as the voltages induced in the drive coils become able to be detected due to the rotation of the motor, the self-excitation timing pulses are then used to sequentially switch over energization of the drive coils to drive the motor. Thus, the motor can be smoothly started.

BRIEF DESCRIPTION OF THE DRAWINGS

FIG. 4 shows signal waveforms appearing in the system shown in FIG. 3 when the motor is rotating in the forward rotational direction.

DESCRIPTION OF THE PREFERRED EMBODIMENTS

Preferred embodiments of the present invention will now be described in detail with reference to FIGS. 1 to 9.

Figure 1:
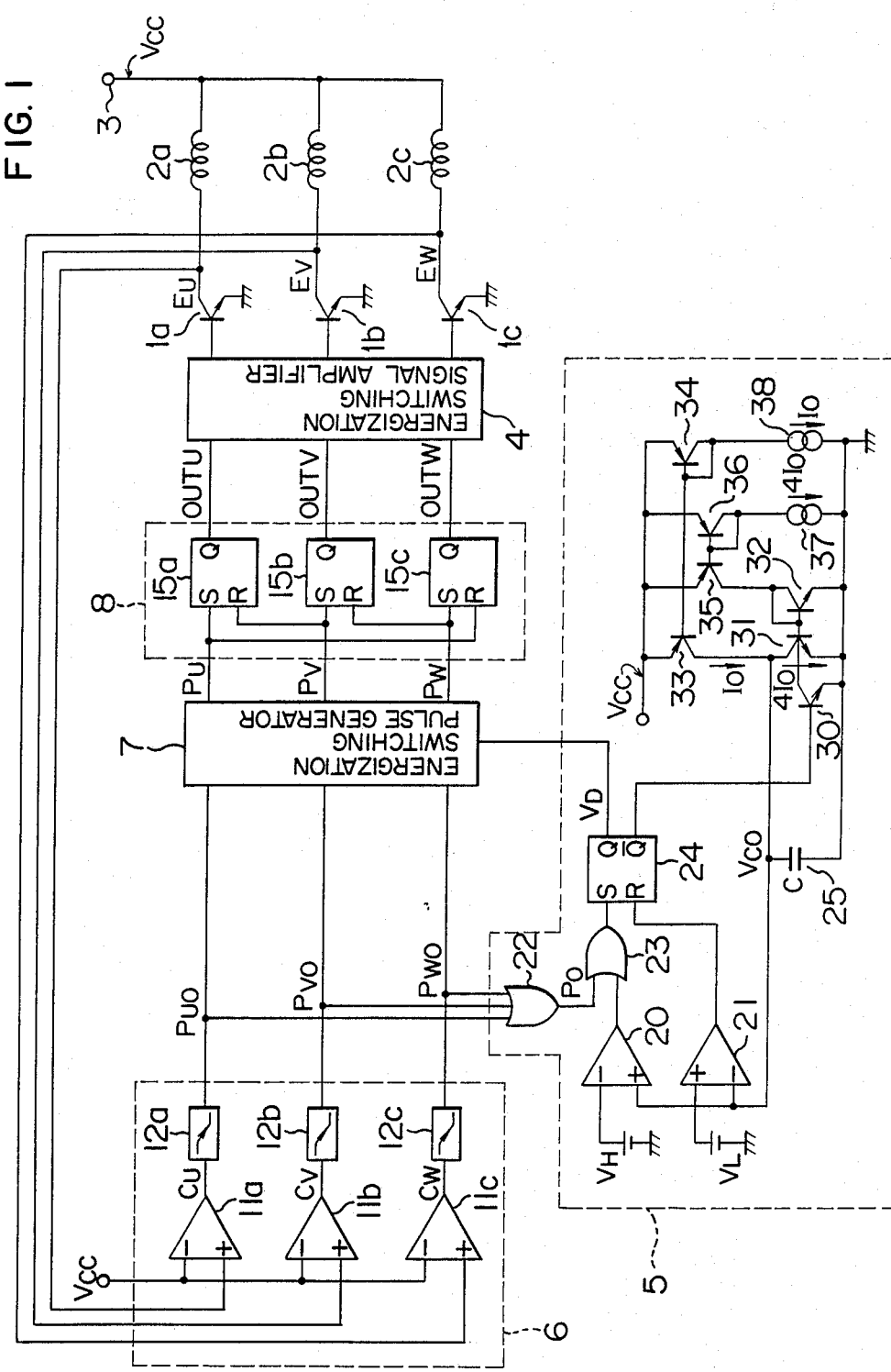
FIG. 1 is a block circuit connection diagram showing the structure of a first embodiment of the brushless motor driving system according to the present invention.

FIG. 1 is a block circuit connection diagram showing the structure of a first embodiment of the brushless motor driving system according to the present invention.

Referring to FIG. 1, drive coils $2a$, $2b$ and $2c$ of a brushless motor are common-connected at one end to a power supply terminal 3 to which a power supply voltage Vcc is applied. These drive coils $2a$, $2b$ and $2c$ are connected at the other ends to the collectors of drive transistors $1a$, $1b$ and $1c$ respectively and also to respective input terminals of a reference phase detector circuit 6 which includes comparators $11a$, $11b$, $11c$ and associated differentiators $12a$, $12b$, $12c$. The drive transistors $1a$, $1b$ and $1c$ are grounded at their emitters. The reference phase detector circuit 6 is connected at its output terminals to corresponding input terminals respectively of an energization switching pulse generator circuit 7 and also to corresponding input terminals respectively of a delay time setting circuit 5. This delay time setting circuit 5 includes comparators 20, 21, OR gates 22, 23, an RS flip-flop 24, a capacitor 25, and transistors 30 to 38 and is connected at its output terminal to another input terminal of the energization switching pulse generator circuit 7. This energization switching pulse generator circuit 7 is connected at its output terminals to corresponding input terminals respectively of an energization switching circuit 8 which includes flip-flops $15a$, $15b$ and $15c$. This energization switching circuit 8 is connected at its output terminals to corresponding input terminals respectively of an energization switching signal amplifier circuit 4. This energization switching signal amplifier circuit 4 is connected at its output terminals to the bases of the drive transistors $1a$, $1b$ and $1c$ respectively.

In FIG. 1, voltages $E_U$, $E_V$ and $E_W$ are induced in the drive coils $2a$, $2b$ and $2c$ respectively when the brushless motor is rotating.

The operation of the first embodiment of the brushless motor driving system of the present invention having the structure described above will now be described with reference to FIG. 2 which shows signal waveforms appearing in the system shown in FIG. 1.

Figure 2:
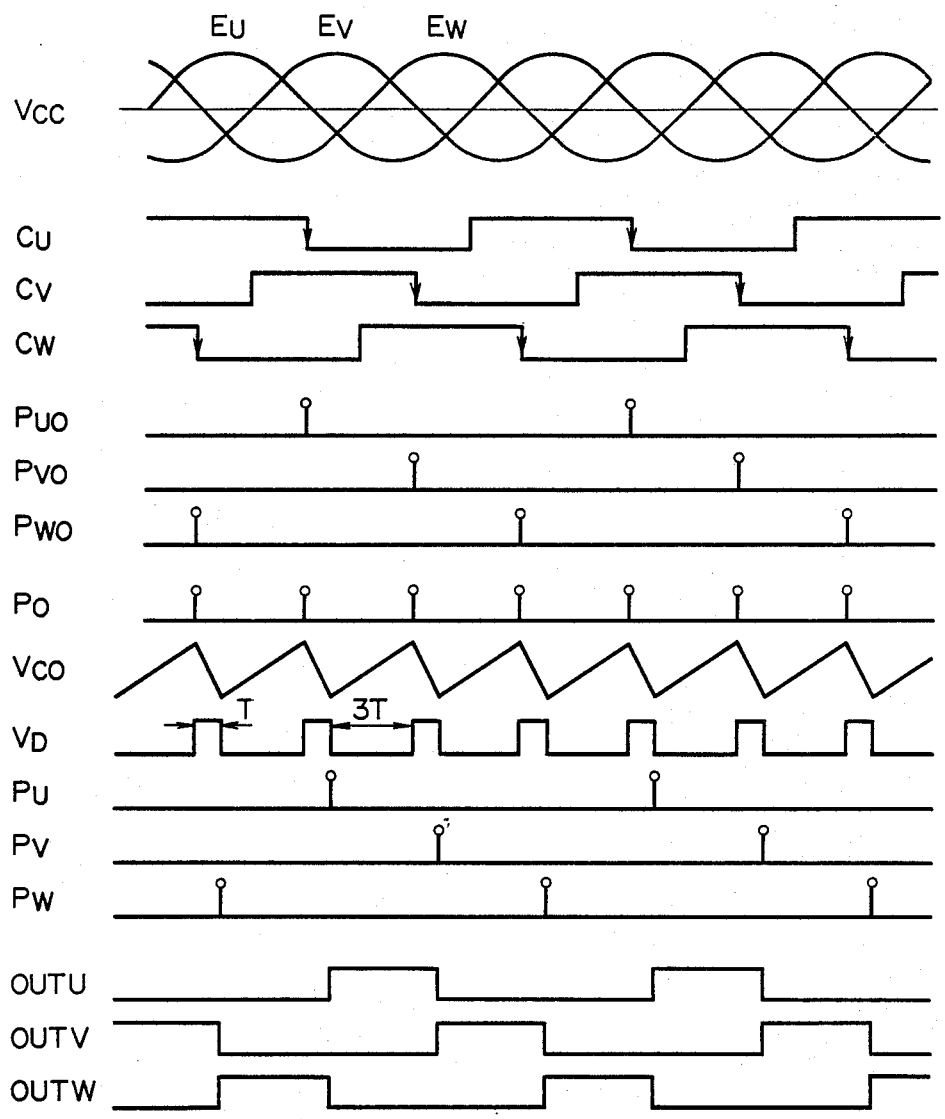
FIG. 2 shows signal waveforms appearing in the system shown in FIG. 1.

When the motor rotates, the three-phase voltages $E_U$, $E_V$ and $E_W$ having waveforms as shown in FIG. 2 are induced in the motor drive coils $2a$, $2b$ and $2c$ respectively. In the reference phase detector circuit 6, these induced voltages $E_U$, $E_V$ and $E_W$ are compared with the power supply voltage Vcc by the comparators $11a$, $11b$ and $11c$ respectively, and output signals $C_U$, $C_V$ and $C_W$ having a rectangular waveform as shown in FIG. 2 are generated from the respective comparators $11a$, $11b$ and $11c$. The differentiators $12a$, $12b$ and $12c$ differentiate the trailing edges of the rectangular waveform signals $C_U$, $C_V$ and $C_W$ and generate reference phase pulse signals $P_{UO}$, $P_{VO}$ and $P_{WO}$ as their output signals respectively. These reference phase pulse signals $P_{UO}$, $P_{VO}$ and $P_{WO}$ indicate the crossing timing of the falling induced voltages $E_U$, $E_V$ and $E_W$ with the level of the power supply voltage Vcc and thus represent the reference phase of rotation of the rotor of the brushless motor. These reference phase pulse signals $P_{UO}$, $P_{VO}$ and $P_{WO}$ are applied to the energization switching pulse generator circuit 7 and turned into respective energization switching pulse signals $P_U$, $P_V$ and $P_W$ which are delayed by a predetermined delay time T determined by an output signal Vo of the delay time setting circuit 5. These energization switching pulse signals $P_U$, $P_V$ and $P_W$ are applied to the energization switching circuit 8. The flip-flop 15a in the energization switching circuit 8 is set in response to the application of the energization switching pulse signal $P_U$. Then, when the energization switching pulse signal $P_V$ is applied, the flip-flop 15b is set, while the flip-flop 15a is reset. Then, when the energization switching pulse signal $P_W$ is applied, the flip-flop 15c is set, while the flip-flop 15b is reset. Thereafter, the flip-flops 15a, 15b and 15c are repeatedly set and reset in the order described above, and three-phase energization switching signals OUTU, OUTV and OUTW are generated from the energization switching circuit 8.

It will be seen in FIG. 2 that the energization switching signals OUTU, OUTV and OUTW provide optimum energization timing with respect to the induced voltages $E_U$, $E_V$ and $E_W$ respectively. These three-phase energization switching signals OUTU, OUTV and OUTW are applied, after having been power-amplified by the energization switching signal amplifier circuit 4, to the bases of the drive transistors 1a, 1b and 1c respectively, thereby sequentially energizing the motor drive coils 2a, 2b and 2c. Therefore, the brushless motor continues to efficiently rotate.

The operation of the delay time setting circuit 5 will now be described. This delay time setting circuit 5 includes, for example, a charge-discharge circuit for the capacitor designated by the reference numeral 25 in FIG. 1 and having a capacitance value C. When the motor is in a standstill state and is not rotating, the reference phase signals $P_{UO}$, $P_{VO}$ and $P_{WO}$ are not generated. That is, these signals $P_{UO}$, $P_{VO}$ and $P_{WO}$ are not applied to the delay time setting circuit 5. The capacitor 25 having the capacitance value C is charged and discharged through a charge-discharge circuit constituted by the transistors 30 to 38. The capacitor 25 is initially charged with an output current Io of the transistor 33, and the terminal voltage Vco of the capacitor 25 increases. The comparator 20 compares this terminal voltage Vco of the capacitor 25 with a reference voltage $V_H$, while the comparator 21 compares the capacitor terminal voltage Vco with another reference voltage $V_L$. Thus, when the voltages Vco and $V_H$ have the relation $Vco \geq V_H$, the comparator 20 generates an output signal of high level. Because the reference phase pulse signals $P_{UO}$, $P_{VO}$ and $P_{WO}$ are not still generated at that time, the OR gate 22 generates an output signal Po of low level. Therefore, the OR gate 23 generates an output signal of high level to set the flip-flop 24, and the flip-flop 24 generates an output signal Vo. At this time, an inverted output signal of low level appears from the flip-flop 24 to turn off the transistor 30. When the transistor 30 is turned off, the current mirror circuit constituted by the transistors 31 and 32 provides an output current 4Io, so that the capacitor 25 is discharged with the current $3Io = 4Io - Io$.

Then, when the relation $Vco \leq V_L$ holds, the comparator 21 generates its output signal of high level to reset the flip-flop 24, and the transistor 30 is turned on by the inverted output signal of high level appearing from the flip-flop 24. At this time, the current 4Io is not supplied, and the capacitor 25 is charged by the current Io again.

Thereafter, the charge-discharge cycle described above is repeated so that the capacitor 25 is repeatedly charged and discharged at the charge-discharge ratio of 3:1. When the motor starts to rotate, the reference phase pulse signals $P_{UO}$, $P_{VO}$ and $P_{WO}$ are generated, and the output signal Po of the OR gate 22 has a pulse waveform such as shown in FIG. 2. The capacitor 25, which repeats the charge-discharge cycle, is discharged when the relation $Vco \geq V_H$ is reached to set the flip-flop 24 through the OR gate 23 to which the pulse signal Po is applied. Thus, as shown in FIG. 2, the terminal voltage Vco of the capacitor 25 changes in a relation synchronous with a logical sum Po of the reference phase pulse signals $P_{UO}$, $P_{VO}$ and $P_{WO}$.

The coil energization timing under the above condition will now be described. Each of the pulse signals Po representing a logical sum of the signals $P_{UO}$, $P_{VO}$ and $P_{WO}$ is generated each time the waveform of each of the falling induced voltages $E_U$, $E_V$ and $E_W$ crosses the level of the power supply voltage Vcc. That is, the pulse signals Po are generated at an angular interval of an electrical angle of 120°. The capacitor 25 repeats its charge-discharge cycle in synchronism with the pulse signal Po, and one cycle corresponds to the electrical angle of 120°. Thus, when the charge-discharge ratio of the capacitor 25 is set at 3:1, the delay time T set by the delay time setting circuit 5 corresponds to an electrical angle of 30°. Therefore, the manner of drive coil energization is such that, after the lapse of the period of time T corresponding to the electrical angle of 30° after the waveform of the voltage induced in the drive coil of the frist phase crosses the level of the power supply voltage Vcc, energization of the drive coil of the second phase is started, and, after the period of time corresponding to the electrical angle of 120° further elapses, energization of the drive coil of the third phase is started. Thus, on the basis of the energization period of time of a drive coil of the present energization phase, the energization timing and energization period of time of a drive coil of a next energization phase are determined. Therefore, any variation in the rotation speed of the brushless motor can be very accurately followed up, so that the optimum energization timing and period for the drive coils of the individual phases can be maintained. Further, the brushless motor driving system has an additional merit from the viewpoint of costs, because its structure is simple and it requires a very small number of external accessory parts. Also, because the energization timing and period for the drive coils of the individual phases depend only on the current charge-discharge ratio and do not depend on the capacitance value of the capacitor 25 and the levels of the reference voltages $V_H$ and $V_L$, the brushless motor driving system can be easily designed and can operate with high reliability.

Figure 3:
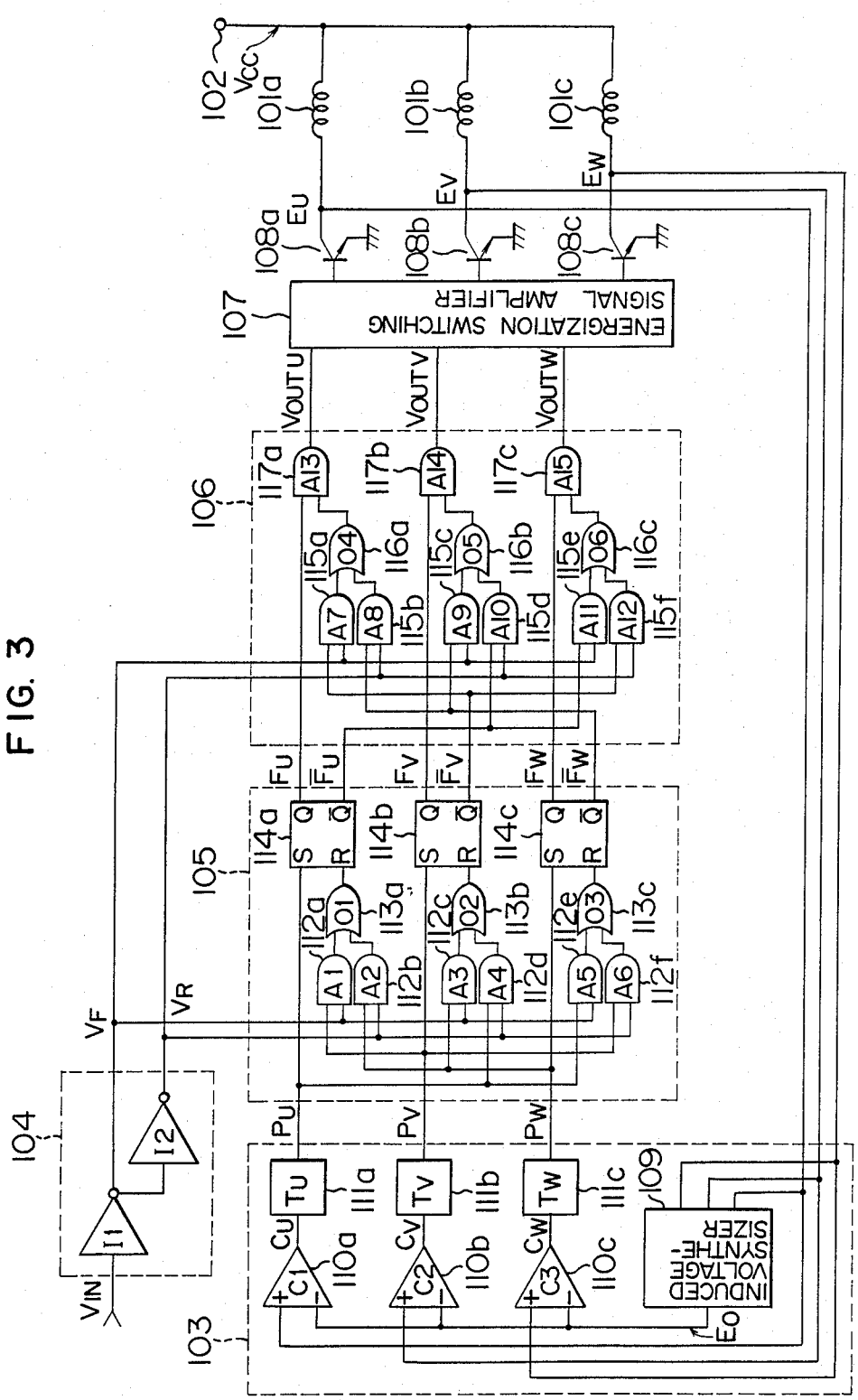
FIG. 3 is a block circuit connection diagram showing the structure of a second embodiment of the brushless motor driving system according to the present invention.

A second embodiment of the present invention will now be described. FIG. 3 is a block circuit connection diagram showing the structure of this second embodiment of the brushless motor driving system according to the present invention.

Referring to FIG. 3, drive coils 101a, 101b and 101c of a brushless motor are common-connected at one end to a power supply terminal 102 to which a power supply voltage Vcc is applied. These drive coils 101a, 101b and 101c are connected at the other ends to the collectors of drive transistors 108a, 108b and 108c respectively and also to respective input terminals of an induced voltage synthesizing circuit 109 in an energization timing detector circuit 103. The drive transistors 108a, 108b and 108c are grounded at their emitters. The energization timing detector circuit 103 includes, besides the induced voltage synthesizing circuit 109, comparators 110a, 110b, 110c and associated edge detectors 111a, 111b, 111c. In the energization timing detector circuit 103, the induced voltage synthesizing circuit 109 is connected at its output terminal to inverting input terminals of the comparators 110a, 110b and 110c, and these comparators 110a, 110b and 110c are connected at their non-inverting input terminals to the collectors of the drive transistors 108a, 108b and 108c respectively. The comparators 110a, 110b and 110c are connected at their output terminals to input terminals of the edge detectors 111a, 111b and 111c respectively. The edge detectors 111a, 111b and 111c are connected at their output terminals to respective input terminals of a first logic circuit 105 which includes AND gates 112a to 112f, OR gates 113a, 113b, 113c and RS flip-flops 114a, 114b, 114c. The first logic circuit 105 is connected at its output terminals to respective input terminals of a second logic circuit 106 which includes AND gates 115a to 115f, OR gates 116a, 116b, 116c and AND gates 117a, 117b, 117c.

The second logic circuit 106 is connected at its output terminals to respective input terminals of an energization switching signal amplifier circuit 107. This energization switching signal amplifier circuit 107 is connected at its output terminals to the bases of the drive transistors 108a, 108b and 108c respectively. A forward-backward switching circuit 104, whcih includes inverters I1 and I2, is connected at its output terminals to respective input terminals of the first logic circuit 105 and also to respective input terminals of the second logic circuit 106.

Figure 5:
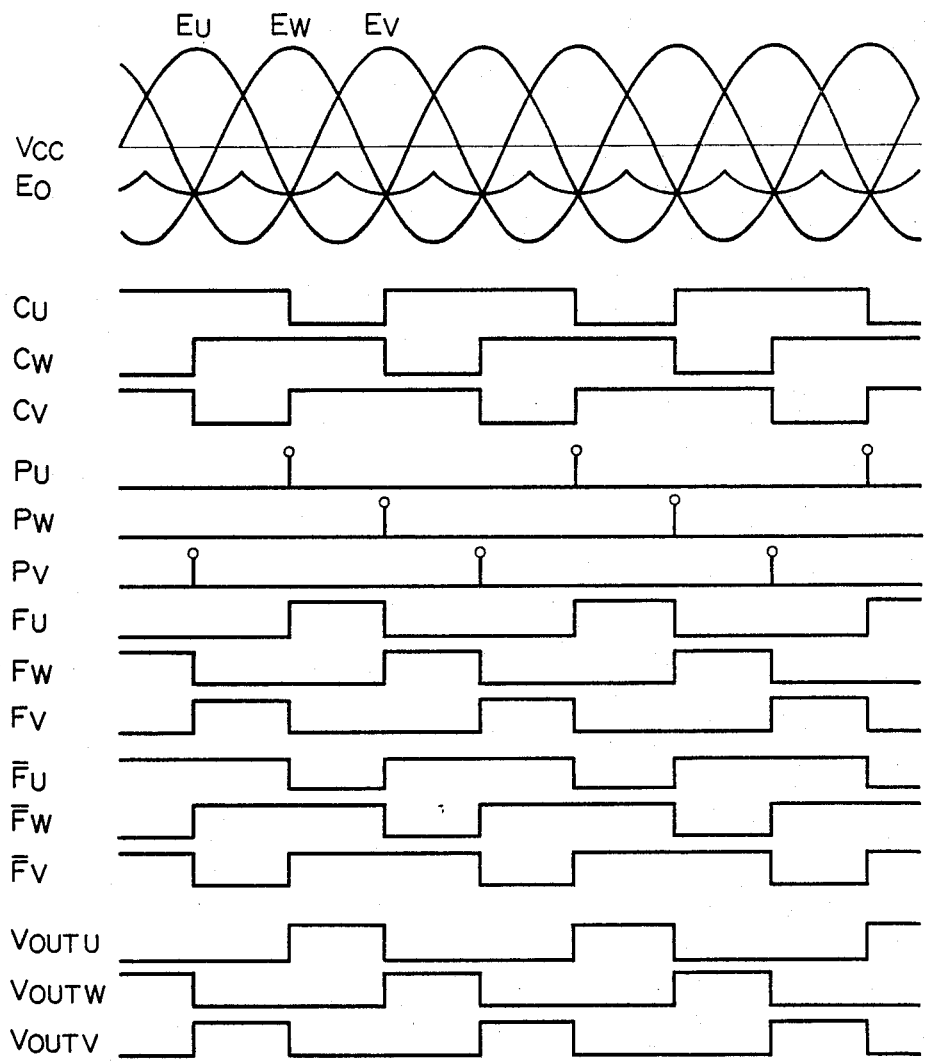
FIG. 5 shows signal waveforms appearing in the system shown in FIG. 3 when the motor is rotating in the backward rotational direction.
Figure 6:
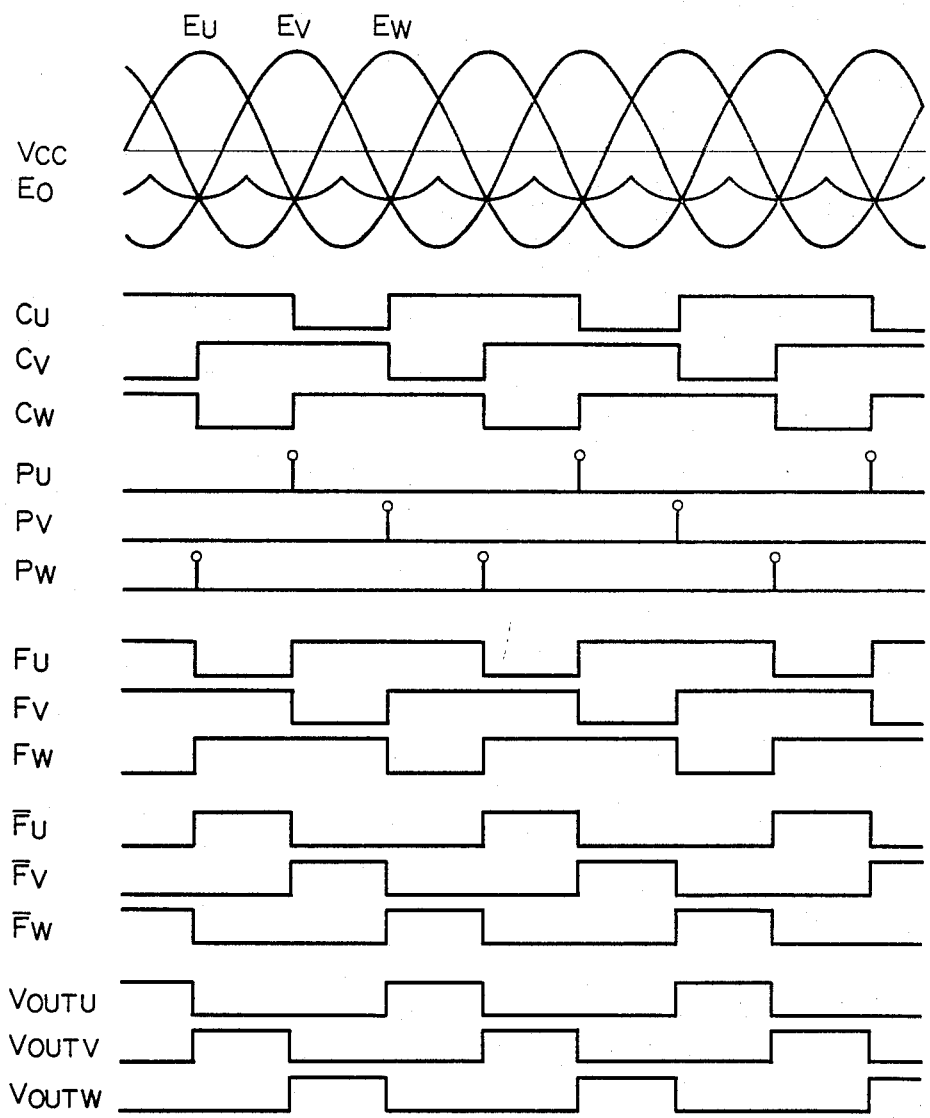
FIG. 6 shows signal waveforms appearing in the system shown in FIG. 3 when the rotational direction of the motor is changed.

The operation of the second embodiment of the brushless motor driving system of the present invention having the structure described above will now be described with reference to FIGS. 4 to 6.

First, the operation of the brushless motor driving system will be described with reference to FIG. 4 which shows operating signal waveforms appearing in the system when the motor is rotating in the forward rotational direction.

In FIG. 3, voltages $E_U$, $E_V$ and $E_W$ are induced in the drive coils 101a, 101b and 101c of the individual phases respectively, when the brushless motor is rotating. The induced voltage synthesizing circuit 109 synthesizes peak portions of the waveforms of the induced voltages $E_U$, $E_V$ and $E_W$ of the individual phases, inverts the synthesized voltage with respect to the level of the power supply voltage Vcc, and multiply the resultant voltage by ½ to thereby obtain a voltage waveform Eo. The voltage signals $E_U$, $E_V$, $E_W$ and Eo are processed by the comparators 110a, 110b and 110c. For example, the voltage signals $E_U$ and Eo are applied to the comparator 110a. When the relation $E_U \geqq Eo$ holds between $E_U$ and Eo, the comparator 110a generates a rectangular waveform output signal Cu having a high level, while when the relation $E_U < Eo$ holds, the rectangular waveform output signal $C_U$ of the comparator 110a has a low level. FIG. 4 shows the waveforms of the output signals $C_U$, $C_V$ and $C_W$ of the respective comparators 110a, 110b and 110c relative to the waveforms of the induced voltage signals $E_U$, $E_V$ and $E_W$. The edge detectors 111a, 111b and 111c detect the trailing edges of the signals $C_U$, $C_V$ and $C_W$ and generate timing pulse signals $P_U$, $P_V$ and $P_W$ respectively.

It is supposed that motor rotation in the forward rotational direction is instructed when a rotational direction command signal $V_{IN}$ of low level is applied to the forward-backward switching circuit 104. Thus, when the rotational direction command signal $V_{IN}$ of low level is applied, the inverter I1 generates an output signal $V_F$ of high level, while the inverter I2 generates an output signal $V_R$ of low level. In the first logic circuit 105, the signal $V_R$ of low level is applied to one of input terminals of each of the AND gates 112b, 112d and 112f, while the signal $V_F$ of high level is applied to one of input terminals of each of the AND gates 112a, 112c and 112e. Therefore, the timing pulse signals $P_U$, $P_V$ and $P_W$ appear as outputs from the respective AND gates 112a, 112c and 112e, while the output signals of the AND gates 112b, 112d and 112f are at low level. As a result, the timing pulse signals $P_V$, $P_W$ and $P_U$ appear as outputs from the respective OR gates 113a, 113b and 113c. When the motor is rotating in the forward rotational direction, the timing pulse signals $P_U$, $P_V$ and $P_W$ from the edge detectors 111a, 111b and 11c are applied to the set terminals S of the RS flip-flops 114a, 114b and 114c respectively, while the timing pulse signals Pv, Pw and Pu from the OR gates 113a, 113b and 113c are applied to the reset terminals R of these RS flip-flops 114a, 114b and 114c respectively. Therefore, output signals $F_U$, $F_V$ and $F_W$ having waveforms such as shown in FIG. 4 are generated from the terminals Q of the RS flip-flops 114a, 114b and 114c respectively, while inverted output signals $\overline{F}_U$, $\overline{F}_V$ and $\overline{F}_W$ are generated from the terminals $\overline{Q}$ of these RS flip-flops 114a, 114b and 114c respectively. The signal $F_U$ is of high level when the signal $P_U$ is turned to high level, but it is of low level when the signal $P_V$ is turned to high level. The signal $F_V$ is of high level when the signal $P_V$ is turned to high level, but it is of low level when the signal $P_W$ is turned to low level. The signal $F_W$ is of high level when the signal $P_W$ is turned to high level, but it is of low level when the signal Pu is turned to high level.

In the second logic circuit 106, the inverter output signal $V_F$ of high level is applied to one input terminal of each of the AND gates 115a, 115c and 115e, while the inverter output signal $V_R$ of low level is applied to one input terminal of each of the AND gates 115b, 115d and 115f. Therefore, the signals $\overline{F}_U$, $\overline{F}_V$ and $\overline{F}_W$ are generated as outputs from the respective AND gates 115a, 115c and 115e, while the output signals of the respective AND gates 115b, 115d and 115f are at low level. As a result, the signals $\overline{F}_U$, $\overline{F}_V$ and $\overline{F}_W$ are generated as outputs from the respective OR gates 116a, 116b and 116c. Therefore, the AND gate 117a generates an output signal $V_{OUTU}$ which is a logical product of the signals $F_U$ and $\overline{F}_V$, the AND gate 117b generates an output signal $V_{OUTV}$ which is a logical product of the signals $F_V$ and $\overline{F}_W$, and the AND gate 117c generates an output signal $V_{OUTW}$ which is a logical product of the signals $F_W$ and $\overline{F}_U$. These signals $V_{OUTU}$, $V_{OUTV}$ and $V_{OUTW}$ have waveforms such as shown in FIG. 4 and provide optimum energization timing with respect to the induced voltage signals $E_U$, $E_V$ and $E_W$. After having been amplified through the energization switching signal amplifier circuit 107, these signals $V_{OUTU}$, $V_{OUTV}$ and $V_{OUTW}$ are applied to the bases of the respective drive transistors 108a, 108b and 108c, so that the motor can be efficiently rotated in the forward rotational direction.

A description will now be made of the case where the brushless motor is to be rotated in the backward rotational direction. In this case, the rotational direction command signal $V_{IN}$ of high level instructing the motor rotation in the backward rotational direction is applied to the forward-backward switching circuit 104, so that the inverter output signals $V_F$ and $V_R$ are turned to low and high levels respectively. The first logic circuit 105 operates in the same way as that when the motor is rotated in the foward rotational direction, and the timing pulse signals $P_W$, $P_U$ and $P_V$ are now generated from the respective OR gates 113a, 113b and 113c. Therefore, as shown in FIG. 5, the output signal $F_U$ of the RS flip-flop 114a is of high level when the signal $P_U$ is turned to high level, but it is of low level when the signal $P_W$ is turned to low level. The output signal $F_V$ of the RS flip-flop 114b is of high level when the signal $P_V$ is turned to high level, but it is of low level when the signal $P_U$ is turned to high level. Similarly, the signal $F_W$ is of high level when the signal $P_W$ is turned to high level, but it is of low level when the signal $P_V$ is turned to high level.

The second logic circuit 106 also operates in the same way as that when the motor is rotated in the forward rotational direction. Thus, when the inverter output signals $V_F$ and $V_R$ of low and high levels respectively are applied as the backward rotation command to the second logic circuit 106, the signals $F_W$, $F_U$ and $F_V$ are generated as outputs from the respective OR gates 116a, 116b and 116c. Therefore, in the second logic circuit 106, the output signal $V_{OUTU}$ of the AND gate 117a represents a logical product of the signals $F_U$ and $\overline{F}_W$, the output signal $V_{OUTV}$ of the AND gate 117b represents a logical product of the signals $F_V$ and $\overline{F}_U$, and the output signal $V_{OUTW}$ of the AND gate 117c represents a logical product of the signals $F_W$ and $\overline{F}_V$. FIG. 5 shows signal waveforms appearing in the second embodiment of the system when the motor rotates in the backward rotational direction. The energization switching signals $V_{OUTU}$, $V_{OUTV}$ and $V_{OUTW}$ have waveforms such as shown in FIG. 5 and provide optimum energization timing with respect to the induced voltage signals $E_U$, $E_V$ and $E_W$. As a result, the motor can be efficiently rotated in the backward rotational direction.

The operation of the brushless motor driving system shown in FIG. 3 will now be described with reference to the case where the rotational direction command signal $V_{IN}$ applied to the forward-backward switching circuit 104 instructs switching-over from the forward rotation to the backward rotation of the motor while the motor is rotating in the forward rotational direction. In this case, the induced voltage signals $E_U$, $E_V$ and $E_W$ have their phases as shown in FIG. 6, and the forward-backward switching circuit 104, the first logic circuit 105 and the second logic circuit 106 operate in the same manner as that when the motor rotates in the backward direction. Therefore, the output signals $F_U$, $F_V$, $F_W$, $\overline{F}_U$, $\overline{F}_V$ and $\overline{F}_W$ of the first logic circuit 105 and the output signals $V_{OUTU}$, $V_{OUTV}$ and $V_{OUTW}$ of the second logic circuit 106 have signal waveforms such as shown in FIG. 6. It will be seen in FIG. 6 that the energization switching signals $V_{OUTU}$, $V_{OUTV}$ and $V_{OUTW}$ have energization timing delayed by a phase of 120° relative to the optimum energization timing with respect to the induced voltage signals $E_U$, $E_V$ and $E_W$ respectively. As a result, torque whose direction is opposite to the forward rotational direction of the motor is produced to brake the rotation of the motor, thereby immediately changing the rotational direction of the motor. As soon as the motor starts to rotate in the backward rotational direction, energization timing as shown in FIG. 5 is now provided so that the motor rotates efficiently in the backward rotational direction. Similarly, when the rotational direction command signal $V_{IN}$ applied to the forward-backward switching circuit 104 instructs switching-over from the backward rotational direction to the forward rotational direction while the motor is rotating in the backward rotational direction, the motor rotation is braked so that the motor immediately starts to rotate in the forward rotational direction.

Figure 7:
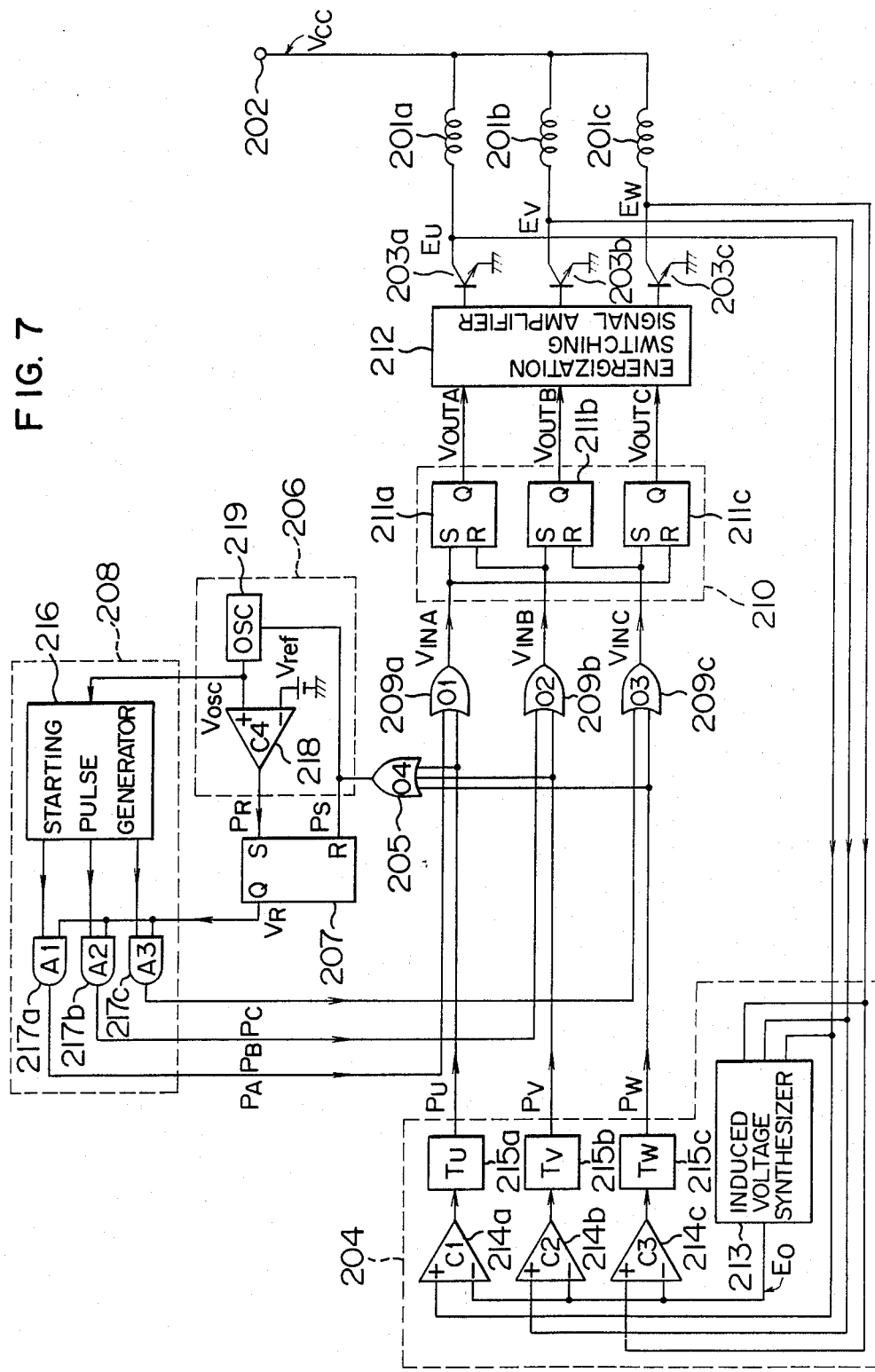
FIG. 7 is a block circuit connection diagram showing the structure of a third embodiment of the brushless motor driving system according to the present invention.

A third embodiment of the present invention will now be described. FIG. 7 is a block circuit connection diagram showing the structure of this third embodiment of the brushless motor driving system according to the present invention.

Referring to FIG. 7, drive coils 201a, 201b and 201c of a brushless motor are common-connected at one end to a power supply terminal 202 to which a power supply voltage Vcc is applied. These drive coils 201a, 201b and 201c are connected at the other end to the collectors of drive transistors 203a, 203b and 203c respectively and also to respective input terminals of an energization timing detector circuit 204. This energization timing detector circuit 204 includes an induced voltage synthesizing circuit 213, comparators 214a, 214b, 214c and associated edge detectors 215a, 215b, 215c. The drive transistors 203a, 203b and 203c are grounded at their emitters. The energization timing detector circuit 204 is connected at its output terminals to corresponding input terminals of timing pulse synthesizing circuits 209a, 209b and 209c respectively and also to respective input terminals of an initializing pulse generator circuit 205. A timer circuit 206, which includes an oscillator (OSC) 219 and a reset comparator 218, is connected at one of its output terminals to a set input terminal of a mode latch circuit 207.

The timer circuit 206 is connected at the other output terminal to one of input terminals of a separate-excitation timing pulse generator circuit 208. This separate-excitation timing pulse generator circuit 208 includes a starting pulse generator 216 and AND gates 217a, 217b, 217c. The initializing pulse generator circuit 205 is connected at its output terminal to a reset input terminal of the mode latch circuit 207 and also to an input terminal of the timer circuit 206. The separate-excitation timing pulse generator circuit 208 is connected at its output terminals to corresponding input terminals of the timing pulse synthesizing circuits 209a, 209b and 209c respectively. The mode latch circuit 207 is connected at its output terminal to the other input terminal of the separate-excitation timing pulse generator circuit 208. The timing pulse synthesizing circuits 209a, 209b and 209c are connected at their output terminals to respective input terminals of an energization switching circuit 210. This energization switching circuit 210 includes RS flip-flops 211a, 211b and 211c and is connected at its output terminals to respective input terminals of an energization switching signal amplifier circuit 212. This energization switching signal amplifier circuit 212 is connected at its output terminals to the bases of the respective drive transistors 203a, 203b and 203c.

Figure 8:
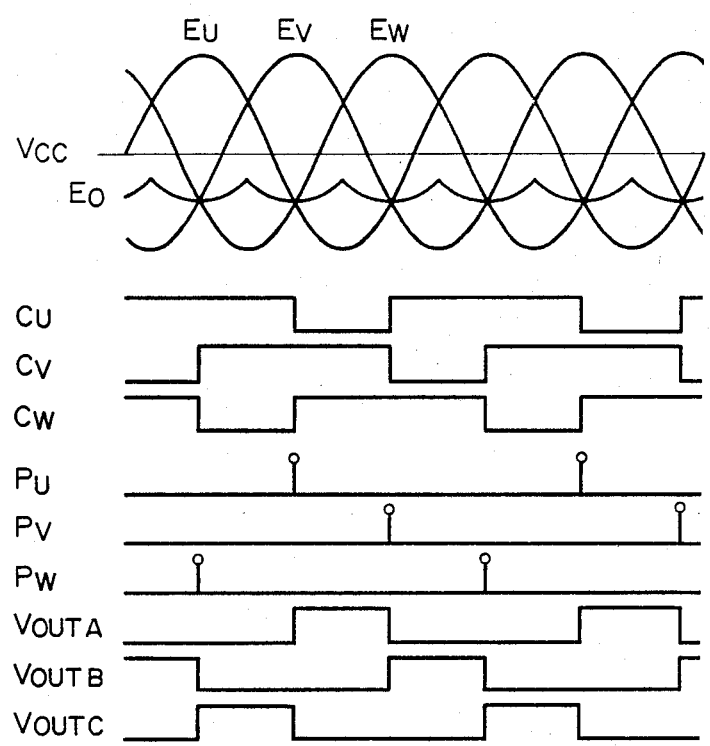
FIG. 8 shows signal waveforms appearing in the system shown in FIG. 7 when the motor is rotating.
Figure 9:
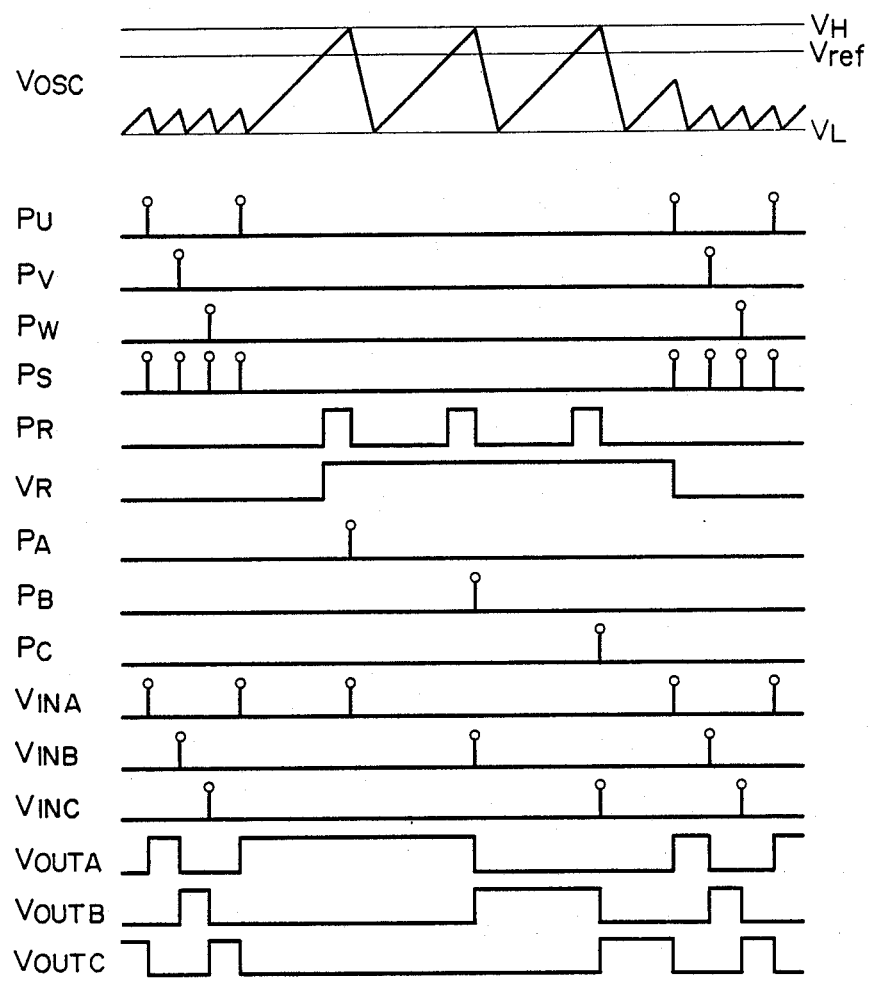
FIG. 9 shows signal waveforms appearing in the system shown in FIG. 7 when the motor is being started.
Figure 10:
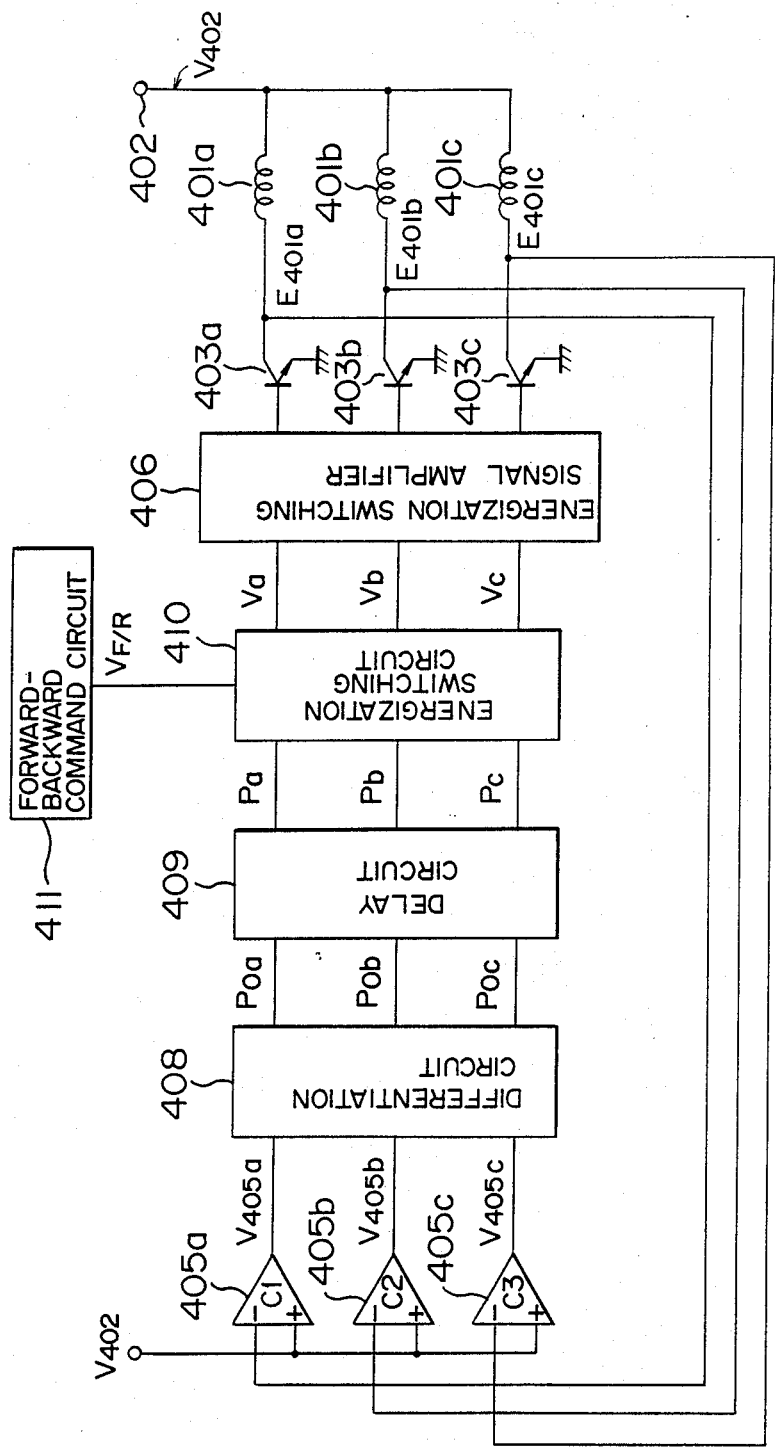
FIG. 10 is a block circuit connection diagram showing the structure of a prior art brushless motor driving system.
Figure 11:
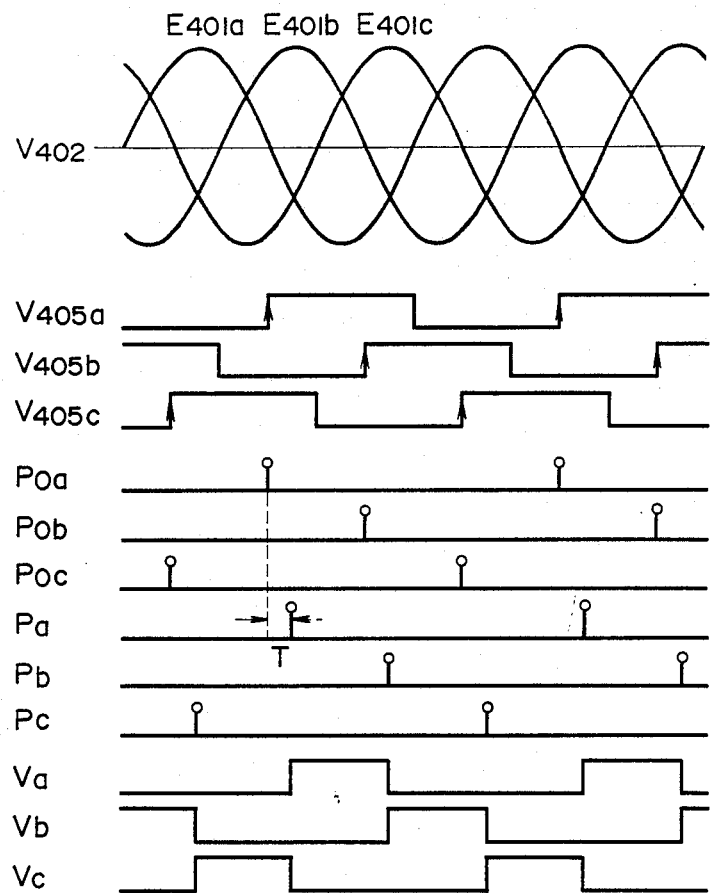
FIG. 11 shows signal waveforms appearing in the system shown in FIG. 10 when the motor is rotating in the forward rotational direction.
Figure 12:
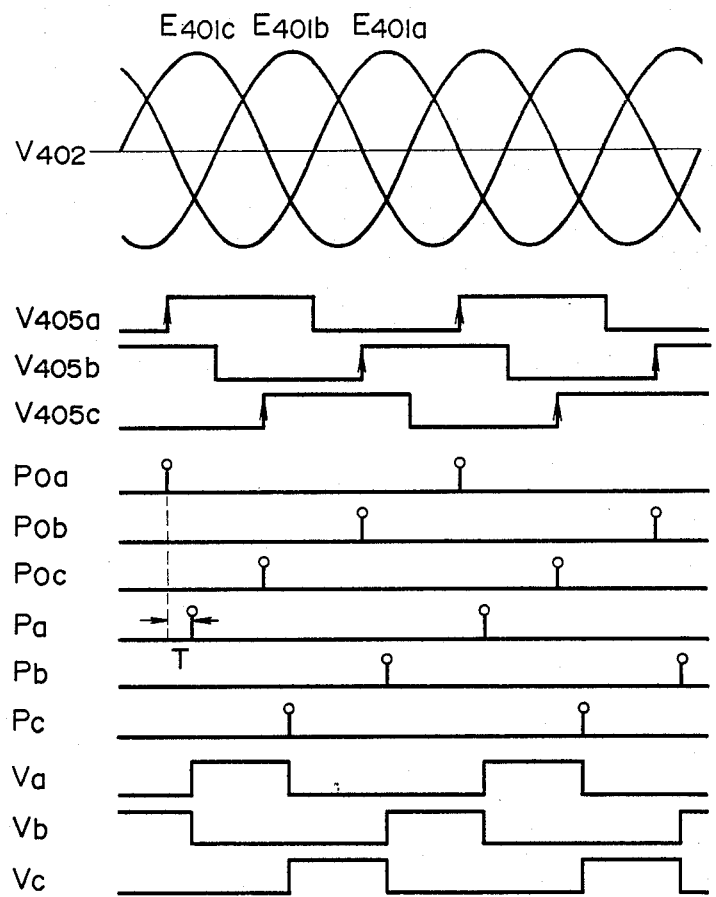
FIG. 12 shows signal waveforms appearing in the system shown in FIG. 10 when the motor is rotating in the backward rotational direction.
Figure 13:
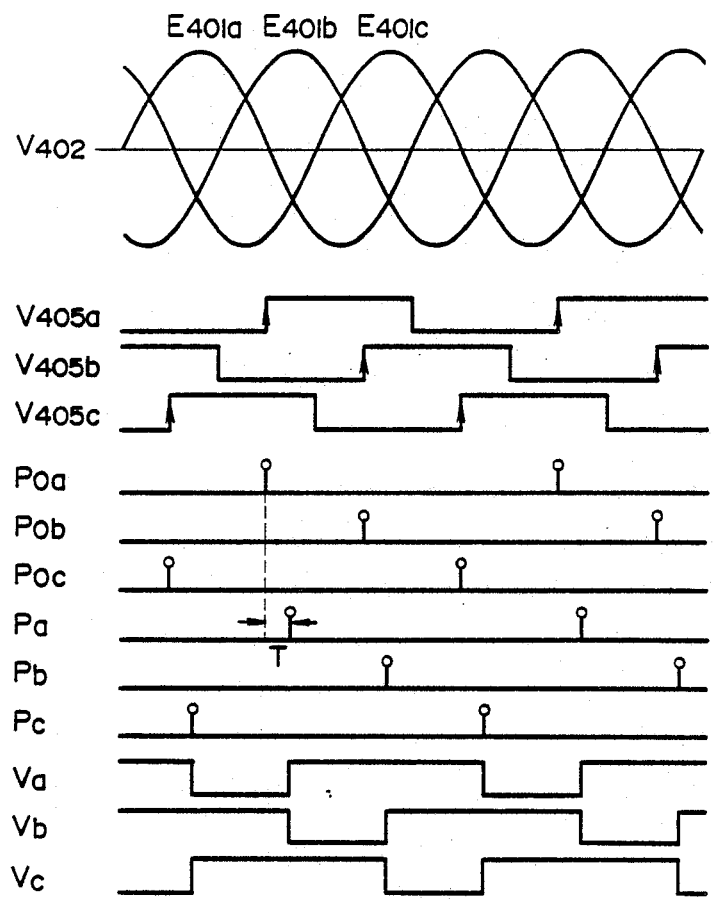
FIG. 13 shows signal waveforms appearing in the system shown in FIG. 10 when the rotational direction of the motor is changed.

The operation of the third embodiment of the brushless motor driving system of the present invention having the structure described above will now be described with reference to FIGS. 8 and 9.

First, the operation of the energization timing detector circuit 204 will be described with reference to FIG. 8.

In FIG. 7, voltages $E_U$, $E_V$ and $E_W$ are induced in the drive coils 201a, 201b and 201c of the individual phases respectively when the brushless motor is rotating. The induced voltage synthesizing circuit 213 synthesizes peak portions of the waveforms of the induced voltages $E_U$, $E_V$ and $E_W$ of the individual phases and converts the resultant voltage waveform into a voltage waveform which has a level half the original level of the synthesized waveform. This resultant voltage waveform is inverted relative to the level of the power supply voltage Vcc to obtain a voltage signal waveform $E_O$ as shown in FIG. 8. The comparators 214a, 214b and 214c compare the voltage signals Eu, Ev and Ew with the voltage signal $E_O$ and generate their output signals $C_U$, $C_V$ and $C_W$ having waveforms such as shown in FIG. 8, respectively. The edge detectors 215a, 215b and 215c detect the trailing edges of the output signals $C_U$, $C_V$ and $C_W$ of the comparators 214a, 214b and 214c and generate self-excitation timing pulse signals $P_U$, $P_V$ and $P_W$ shown in FIG. 8, respectively.

The initializing pulse generator circuit 205 generates an initializing pulse signal Ps (FIG. 9) which is a logical sum of the self-excitation timing pulse signals $P_U$, $P_V$ and $P_W$. The timer circuit 206 generates a separate-excitation mode switching pulse signal $P_R$ when, after application of an initializing pulse $P_S$, a next initializing pulse $P_S$ is not applied within a predetermined period of time.

The operation of the brushless motor driving system shown in FIG. 7 will now be described with reference to FIG. 9. The OSC 219 in the timer circuit 206 generates an output signal $V_{OSC}$ having a waveform shown in FIG. 9, and charge and discharge between levels $V_H$ and $V_L$ is repeated, when the motor is in a standstill state and the initializing pulse signal $P_S$ is not generated from the initializing pulse generator circuit 205. However, when the initializing pulse signal $P_S$ is generated due to the rotation of the motor, discharge occurs each time the initializing pulse signal $P_S$ is turned to high level. That is, the charge and discharge is repeated in synchronism with the initializing pulse signal $P_S$. The reset comparator 218 compares the output voltage $V_{OSC}$ of the OSC 219 with a reference voltage $V_{ref}$. Thus, when the level of the reference voltage $V_{ref}$ is selected to be close to the level $V_H$, the reset comparator 218 generates the separate-excitation mode switching pulse signal $P_R$ having a waveform such as shown in FIG. 9 when the induced voltages Eu, Ev and Ew of the motor cannot be detected.

The mode latch circuit 207 is set by the separate-excitation mode switching pulse signal $P_R$ when the induced voltages of the motor cannot be detected. On the other hand, the mode latch circuit 207 is reset by the initializing pulse signal $P_S$ when the induced voltages of the motor can be detected. Thus, the mode latch circuit 207 generates a mode setting signal $V_R$ having a waveform such as shown in FIG. 9.

The starting pulse generator 216 in the separate-excitation timing pulse generator circuit 208 generates starting pulses, the number of which is equal to the number of phases, in a relation synchronized with the discharge timing of the OSC 219, and these starting pulses are applied to the respective AND gates 217a, 217b and 217c together with the mode setting signal $V_R$. As a result, separate-excitation timing pulses $P_A$, $P_B$ and $P_C$, which are respective logical products of the starting pulses and the mode setting signal $V_R$, as shown in FIG. 9, are generated from the AND gates 217a, 217b and 217c respectively.

The self-excitation timing pulse signals $P_U$, $P_V$, $P_W$ and the separate-excitation timing pulse signals $P_A$, $P_B$, $P_C$ of the corresponding phases are applied to the timing pulse synthesizing circuits 209a, 209b and 209c respectively, so that output signals $V_{INA}$, $V_{INB}$ and $V_{INC}$ representing logical sums of $P_U$, $P_A$; $P_V$, $P_B$; and $P_W$, $P_C$ as shown in FIG. 9 are generated from the timing pulse synthesizing circuits 209a, 209b and 209c respectively. The signal $V_{INA}$ is applied to the set terminal S of the RS flip-flop 211a and to the reset terminal R of the RS flip-flop 211c, the signal $V_{INB}$ is applied to the set terminal S of the RS flip-flop 211b and to the reset terminal R of the RS flip-flop 211a, and the signal $V_{INC}$ is applied to the set terminal S of the RS flip-flop 211c and to the reset terminal R of the RS flip-flop 211b. As a result, energization switching signals $V_{OUTA}$, $V_{OUTB}$ and $V_{OUTC}$ having waveforms as shown in FIG. 9 are generated from the RS flip-flops 211a, 211b and 211c respectively. Thus, at the timing of generation of these energization switching signals $V_{OUTA}$, $V_{OUTB}$ and $V_{OUTC}$, the drive coils 201a, 201b and 201c of the motor are sequentially energized thereby rotating the motor.

Therefore, the operation mode of the third embodiment of the brushless motor driving system according to the present invention is such that, when the motor is not rotating and the induced voltages of the motor cannot be detected, the state of energization of the motor drive coils is sequentially switched over by application of the separate-excitation timing pulse signals to the energization switching circuit 210, thereby starting the rotation of the motor. As soon as the motor starts its rotation and the induced voltages of the motor become able to be detected, the state of energization of the motor drive coils is sequentially switched over by the application of the self-excitation timing pulse signals to the energization switching circuit 210, thereby maintaining the rotation of the motor.

It will be apparent from the foregoing detailed description that, in the brushless motor driving system according to the present invention, the voltages induced in the drive coils of the motor are detected to sequentially switch over energization of the drive coils. Therefore, provision of a rotor position sensor such as a Hall element required hitherto for detecting angular positions of rotation of the rotor is unnecessary, so that the costs of associated parts and the number of connection wires can be decreased. Further, in the brushless motor driving system according to the present invention, the manner of producing the energization switching signals used to switch over energization of the respective drive coils of the motor is such that, on the basis of the period of time of energization of a drive coil of one phase, the energization timing and energization period of time for a drive coil of a next energization phase are set. Therefore, any variation in the speed of the brushless motor can be very accurately followed up, so that the motor can always be driven a optimum energization timing. Further, the brushless motor driving system of the present invention has an additional merit, since its sturcture is simple and it can operate without depending on the operating characteristics of external accessory parts in setting the energization timing. Therefore, the brushless motor driving system of this invention has a merit of a reduction in cost and yet it can operate with high reliability. Further, as soon as the motor rotational direction command signal for instructing the opposite rotational direction is applied to the brushless motor driving system, the rotation of the motor rotating in one direction is braked to immediately change the rotational direction of the motor, and the motor rotating now in the opposite direction can be driven at optimum energization timing in that case.

Furthermore, when the brushless motor is not rotating or when the motor is rotating at a very low speed, and the voltages induced in the drive coils of the motor cannot be detected, the separate-excitation timing pulse signals are used to sequentially energize the drive coils, thereby starting the rotation of the motor. Then, as soon as the motor starts to rotate, and the voltages induced in the drive coils become able to be detected, the self-excitation timing pulse signals are used to sequentially energize the drive coils, thereby maintaining the rotation of the motor. Thus, the rotation of the brushless motor can be smoothly started.

We claim:

1. A system for driving a brushless motor comprising:
   a plurality of motor drive coils of a plurality of phases respectively;
   a plurality of drive transistors connected to said drive coils respectively;
   an energization switching circuit sequentially transmitting a plurality of energization switching signals to said drive transistors respectively so as to switch over energization of said drive coils;
   reference phase detecting means comparing voltages induced in said drive coils with selected one of a neutral point potential of said drive coils and a power supply voltage for detecting a reference phase of rotation of the rotor of the motor, thereby generating a plurality of reference phase pulse signals corresponding to said plurality of phases respectively;
   energization switching pulse generating means for generating a plurality of energization switching pulse signals corresponding to said plurality of phases respectively, when a predetermined delay time has elapsed from the generation of said reference phase pulse signals; and
   delay time setting means for setting said predetermined delay time to a value proportional to a period of time from the time of generation of one of said energization switching pulse signals corresponding to said drive coil of one phase to the time of generation of one of said reference phase pulse signals during a de-energization time period of said drive coil of a succeeding phase to be energized next time.

2. A system for driving a brushless motor comprising:
   a plurality of motor drive coils of a plurality of phases respectively;
   a plurality of drive transistors connected to said drive coils respectively
   a forward-backward switching circuit for generating a motor rotational driection command signal;
   energization timing detecting means detecting voltages induced in said drive coils for generating a plurality of timing pulse signals corresponding to said plurality of phases respectively to be used for switching over energization of said drive coils;
   a first logic circuit including a plurality of flip-flops selectively set or reset by the application of said timing pulse signals and said motor rotational direction command signal; and
   a second logic circuit for converting output signals of said first logic circuit into corresponding energization switching signals according to a level of said motor rotational direction command signal so as to sequentially energize said drive transistors connected to said drive coils respectively.

3. A system for driving a brushless motor comprising:
   a plurality of motor drive coils of a plurality of phases respectively;
   a plurality of drive transistors connected to said drive coils respectively;
   energization timing detecting means detecting voltages induced in said drive coils for generating a plurality of self-excitation timing pulse signals corresponding to said plurality of phases respectively to be used for switching over energization of said drive coils;
   an initializing pulse generating circuit for generating an initializing pulse signal as a logical sum of said self-excitation timing pulse signals;
   a timer circuit for generating a plurality of separate-excitation mode switching pulse signals when, after inputting one said initializing pulse signal, a next initializing pulse signal is not inputted within a predetermined period of time;
   a mode latch circuit including a flip-flop to be reset by said initializing pulse signal and to be set by one of said separate-excitation mode switching pulse signals for generating a mode setting signal for establishing a separate-excitation switching mode or a self-excitation switching mode
   a separate-excitation timing pulse generating circuit for generating a plurality of separate-excitation timing pulse signals corresponding to said plurality of phases, respectively, only in said separate-excitation switching mode thereby to switch over said drive coils to be energized by said initializing pulse signal in said separate-excitation switching mode;
   a plurality of timing pulse synthesizing circuits for generating a plurality of energization switching pulse signals each thereof being obtained by a logical sum of one said self-excitation timing pulse signal corresponding to on of said plurality of phases and one said separate-excitation timing pulse signal corresponding to the sam phase; and
   an energization switching circuit for generating a plurality of energization switching signals in response to the application of said energization switching pulse signals so as to sequentially energize said drive transistors connected to said drive coils respectively.

* * * * *